US010543489B2

(12) United States Patent
Green et al.

(10) Patent No.: US 10,543,489 B2
(45) Date of Patent: Jan. 28, 2020

(54) DELUMPER AND METHOD OF DELUMPING EDIBLE MATERIAL

(71) Applicant: General Mills, Inc., Minneapolis, MN (US)

(72) Inventors: Daniel R Green, Minnetonka, MN (US); Michael J Engstrom, Minnetonka, MN (US); David Gale, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 235 days.

(21) Appl. No.: 15/657,335

(22) Filed: Jul. 24, 2017

(65) Prior Publication Data

US 2019/0022661 A1  Jan. 24, 2019

(51) Int. Cl.
| | | |
|---|---|---|
| *B02C 13/00* | (2006.01) | |
| *B02C 13/28* | (2006.01) | |
| *B02C 13/284* | (2006.01) | |
| *B02C 13/13* | (2006.01) | |
| *B02B 3/08* | (2006.01) | |

(Continued)

(52) U.S. Cl.
CPC .............. *B02C 13/28* (2013.01); *A23P 10/25* (2016.08); *B02B 3/08* (2013.01); *B02C 13/13* (2013.01); *B02C 13/284* (2013.01); *B02B 1/06* (2013.01); *B02C 2013/2808* (2013.01)

(58) Field of Classification Search
CPC ....... B02C 13/28; B02C 13/284; B02C 13/13; B02B 2013/2808; A23P 10/25; B02B 3/08
USPC .................. 241/73, 88.4, 89.3; 426/518–519
See application file for complete search history.

(56) References Cited

U.S. PATENT DOCUMENTS 3,850,364 A * 11/1974 Robbins .................. B02C 18/14
241/51
3,891,152 A * 6/1975 Guggenheimer ..... B02C 13/284
241/88.4

(Continued)

FOREIGN PATENT DOCUMENTS

CN        202823486          3/2013

OTHER PUBLICATIONS http://www.kemutecusa.com/products/kek-mills-grinders/kek-kibbler (2017).

(Continued)

*Primary Examiner* — Faye Francis
(74) *Attorney, Agent, or Firm* — Diederiks & Whitelaw, PLC; Gregory P. Kaihoi, Esq.

(57) ABSTRACT

A delumper includes a housing defining a chamber in which edible material is received. The housing includes a screen having a plurality of holes and a plurality of inwardly extending fingers. The holes are sized such that edible material of a first diameter is capable of passing through the holes and edible material of a second, larger diameter is incapable of passing through the holes. The fingers are arranged in at least a first row, and the first row is located at or between a 5:00 position and a 7:30 position. The delumper further includes a rotatable shaft including a plurality of paddles spaced along a length of the shaft. When the shaft rotates, each of the paddles passes between adjacent fingers of the first row such that edible material located within the chamber is forced into contact with the fingers and cleaved by the paddles.

22 Claims, 5 Drawing Sheets

(51) Int. Cl.
*A23P 10/25* (2016.01)
*B02B 1/06* (2006.01)

(56) References Cited

U.S. PATENT DOCUMENTS

| | | | | |
|---|---|---|---|---|
| 4,344,581 A * | 8/1982 | Redemann | ............... | B02C 4/10 |
| | | | | 241/101.75 |
| 4,385,732 A | 5/1983 | Williams | | |
| 4,489,896 A * | 12/1984 | Cerroni | ............... | B02C 18/0084 |
| | | | | 241/167 |
| 5,062,575 A * | 11/1991 | Barnabie | ............... | B02C 13/282 |
| | | | | 241/189.2 |
| 5,454,521 A * | 10/1995 | Frazier | ................... | B02C 13/28 |
| | | | | 241/101.74 |
| 5,526,988 A * | 6/1996 | Rine | ....................... | B02C 13/02 |
| | | | | 241/189.1 |
| 5,628,467 A * | 5/1997 | Graveman | ............. | B02C 13/04 |
| | | | | 241/194 |
| 5,697,704 A | 12/1997 | Coyle | | |
| 5,730,371 A | 3/1998 | Dongieux, Jr. et al. | | |
| 5,842,653 A * | 12/1998 | Elliott | ..................... | B02C 13/04 |
| | | | | 241/88.1 |
| 5,887,808 A * | 3/1999 | Lucas | ..................... | B02C 13/10 |
| | | | | 241/188.1 |
| 5,904,306 A * | 5/1999 | Elliott | ..................... | B02C 13/04 |
| | | | | 241/194 |
| 7,243,868 B2 * | 7/2007 | Elliott | ..................... | B02C 13/02 |
| | | | | 241/188.1 |
| 9,174,220 B2 * | 11/2015 | Lucas | ..................... | B02C 13/00 |
| 9,186,683 B2 * | 11/2015 | Hongo | ................... | B02C 13/06 |
| 2017/0165676 A1 | 6/2017 | Harthoorn et al. | | |

OTHER PUBLICATIONS http://www.wamgroup.com/en-GB/corporate/Product/DLP/Lump-Breakers (2017).
http://www.munsonmachinery.com/news/T-0727RotaryLumpBreaker.asp (2017).
http://showes.com/products/size-reduction/power/grater (2017).

* cited by examiner

DELUMPER AND METHOD OF DELUMPING EDIBLE MATERIAL

BACKGROUND OF THE INVENTION

The present invention pertains to food production and, more particularly, to delumping edible material during food production so as to consistently produce appropriately sized pieces of edible material.

Certain edible materials, such as granola, tend to form clumps during production. While some clumping may be desirable, it is important to ensure that the clumps are not so large as to be difficult to eat. Also, clumps of sufficient size can be difficult to process. Accordingly, machines known as delumpers are sometimes used to break up clumps of edible material. Although delumpers do succeed in this task, delumpers also generate a substantial amount of fine particles from the edible material. This too may be undesirable for certain food products. Generally, the goal is for all the edible material produced to fall within a desired size range, i.e., for the delumper to produce consistently sized clumps of edible material.

Prior art delumpers tend to shatter rather than cleave edible material. This contributes to fine particle generation and results in less consistent clump sizing. For purposes of the present invention, "cleaving" means splitting or severing a piece of edible material, especially along a natural line or grain, so that two pieces of edible material are formed, with one on either side of the plane of contact. In contrast, "shattering" means breaking up a piece of edible material, not only along the plane of contact but along a plurality of planes, so that three or more pieces are formed. Of course, in practice, some amount of both cleaving and shattering is likely to occur in a given delumper. Recognizing this, there is still a need in the art for a delumper where a majority of the delumping occurs via cleaving rather than shattering, thereby producing clumps of a more consistent size and minimizing the generation of fine particles, i.e., maximizing the number of pieces at the largest size without going over an upper limit and while minimizing the number of smaller pieces.

SUMMARY OF THE INVENTION

The present invention is directed to a delumper comprising a housing defining a chamber in which edible material is received. The housing includes a screen having a plurality of holes and a plurality of inwardly extending fingers. The plurality of holes are sized such that edible material of a first diameter is capable of passing through the plurality of holes and edible material of a second, larger diameter is incapable of passing through the plurality of holes. The plurality of fingers are arranged in at least a first row, and the first row is located at or between a 5:00 position and a 7:30 position, i.e., within a 75° range. The delumper further comprises a rotatable shaft including a plurality of paddles spaced along a length of the shaft. When the shaft rotates, each of the plurality of paddles passes between adjacent fingers of the first row such that edible material located within the chamber is forced into contact with the plurality of fingers and cleaved by the plurality of paddles. The edible material can be granola or cereal clusters, for example.

In one embodiment, the plurality of fingers are further arranged in a second row, and the second row is located at the 8:00 position or between the 8:00 position and the first row. In another embodiment, the plurality of fingers are further arranged in a third row, and the third row is located at a 4:00 position or between the 4:00 position and the first row.

The delumper further comprises a motor configured to rotate the shaft. More specifically, the shaft is configured to rotate at a speed which is quite low, preferably at less than 100 revolutions per minute (RPM). More preferably, the motor is configured to rotate the shaft at 30 to 60 RPM.

Each of the plurality of holes has a hole edge, and the hole edges are blunt. Similarly, each of the plurality of paddles has a paddle edge, and each of the plurality of fingers has a finger edge. The paddle edges and finger edges are blunt as well. By "blunt", it is meant that the hole edges, paddle edges and finger edges are rounded or chamfered.

In one embodiment, each of the plurality of holes has a diameter in the order of 0.750 to 1.50 inches, and each of the fingers of the first row is spaced from an immediately adjacent finger of the first row by 1.50 to 2.00 inches. Also, each of the plurality of paddles is spaced from an immediately adjacent paddle of the plurality of paddles by 1.50 to 1.75 inches. Preferably, each of the plurality of paddles is longitudinally centered relative to the adjacent fingers of the first row between which the paddle passes.

In one embodiment, each of the plurality of paddles is offset by 90 degrees relative to an immediately adjacent paddle of the plurality of paddles.

The screen is located at the bottom of the housing. In one embodiment, the screen has an arcuate cross section and is shaped as a partial cylinder, with a center of the cylinder being located at the shaft. In another embodiment, the chamber defined by the housing is cylindrical.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
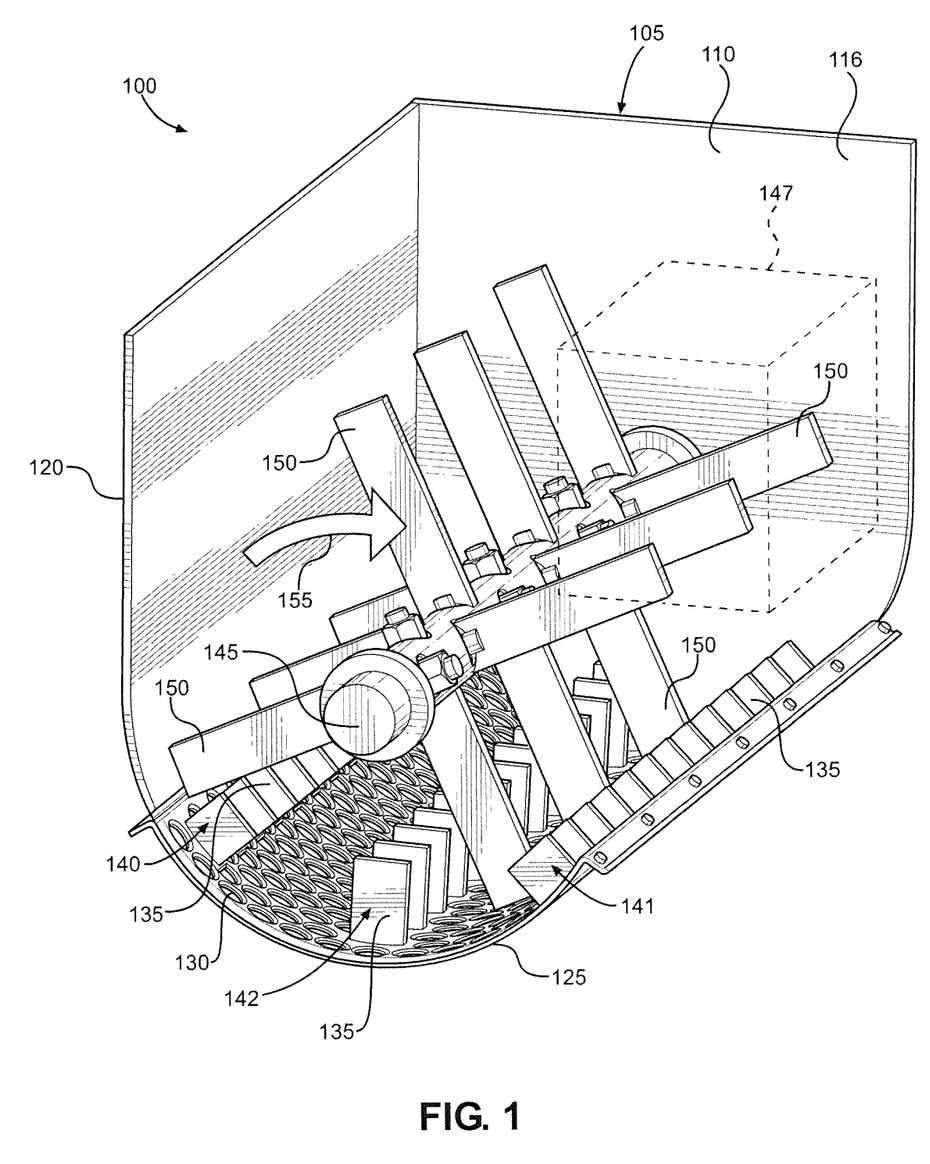
FIG. 1 is a perspective view of a delumper constructed in accordance with a first embodiment of the present invention.
Figure 2:
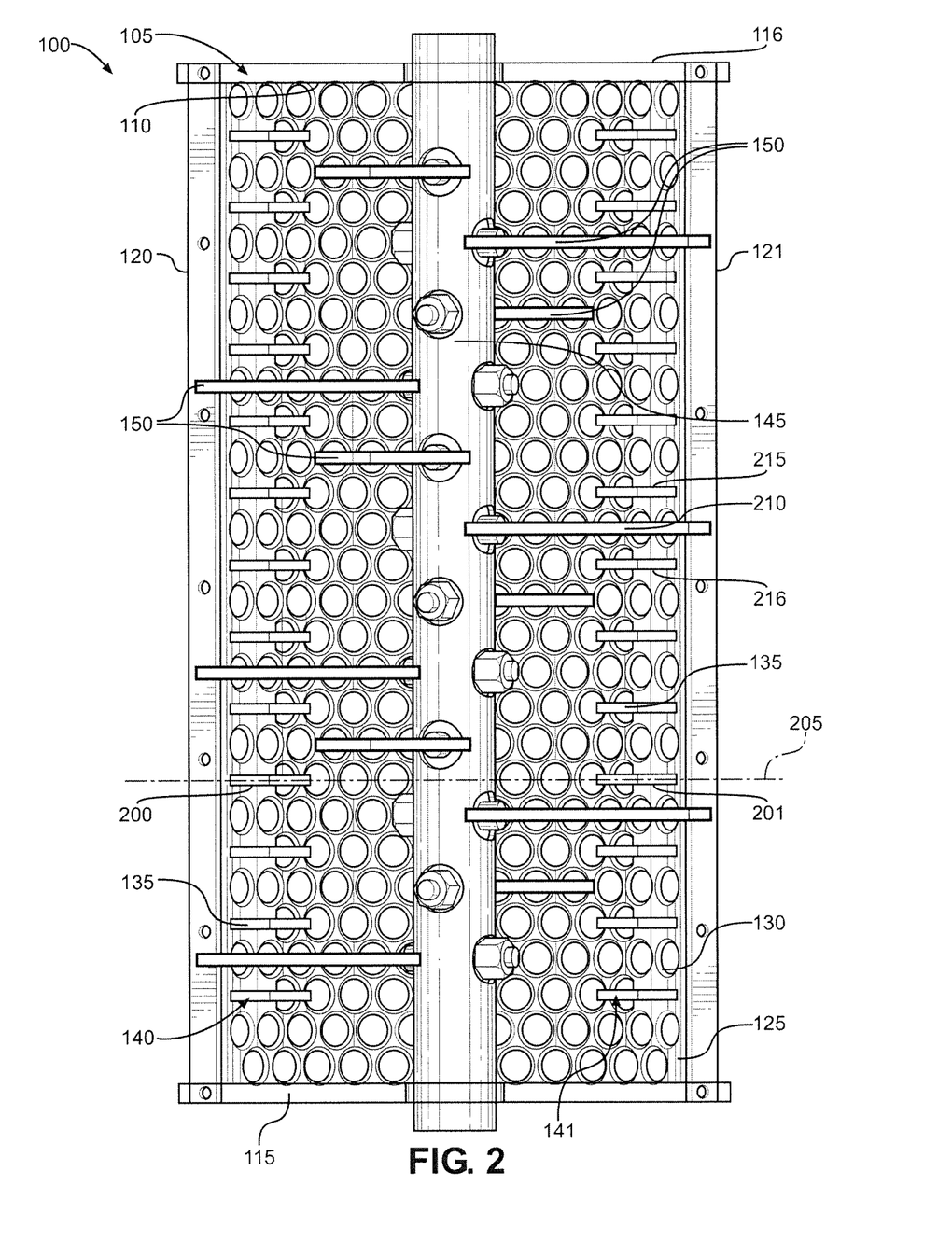
FIG. 2 is a top view of the delumper.

With initial reference to FIGS. 1 and 2, there is shown a delumper 100 constructed in accordance with a first embodiment of the present invention. Delumper 100 includes a housing 105 that defines a chamber 110 in which edible material, such as granola chunks which could be up to the size of about grapefruits, softballs or even larger, is received. Housing 105 is made up of a front wall 115, a rear wall 116, a left sidewall 120, a right sidewall 121 and a screen 125, with front wall 115 and right sidewall 121 not being shown in FIG. 1 to more clearly illustrate internal structure. Screen 125 is located at the bottom of housing 105 and includes a plurality of holes 130. Preferably, each hole 130 has a diameter set to a desired product size, 0.750 to 1.50 inches in accordance with the most preferred embodiment employed for granola, such that clumps of edible material with smaller diameters pass through screen 125 and exit housing 105, while clumps of edible material with larger diameters remain in housing 105. Screen 125 also includes a plurality of fixed, inwardly extending and cantilevered fingers 135. Fingers 135 are arranged in three rows: a first row 140 located proximate left sidewall 120; a second row 141 located proximate right sidewall 121; and a third row 142 located proximate the center of screen 125. Preferably, for a given one of rows 140-142, each finger 135 is spaced from an immediately adjacent finger 135 by 1.50 to 2.00 inches or, more generally, by 150 to 200% of the diameter of holes 130 (i.e., 1.13 to 3.00 inches). As will become clear, this spacing helps break the edible material into clumps that will fit through holes 130.

Delumper 100 also includes a rotatable shaft 145 that is driven by a motor 147. Shaft 145 extends from front wall 115 to rear wall 116 and includes a plurality of paddles 150. Paddles 150 are spaced along the length of shaft 145, with a single paddle 150 located at a given longitudinal position. Each paddle 150 is offset by 90 degrees relative to an immediately adjacent paddle 150. When shaft 145 rotates, paddles 150 move through chamber 110 in a clockwise direction 155. In particular, paddles 150 pass equidistantly between respective, adjacent fingers 135. To accommodate this, corresponding fingers 135 of each row 140-142 are located at the same longitudinal position along screen 125. For example, the first finger 135 of row 140 is located at the same longitudinal position as the first finger 135 of row 141, which is located at the same longitudinal position as the first finger 135 of row 142. Each paddle 150 is longitudinally centered relative to those fingers 135 between which it passes. Accordingly, the spacing of paddles 150 matches the spacing of fingers 135, with each paddle 150 preferably being spaced from an immediately adjacent paddle 150 by 1.50 to 1.75 inches and paddles 150 being offset longitudinally by 0.750 to 0.875 inches relative to fingers 135. As a result of this arrangement, a clump of edible material that enters chamber 110 but cannot fit through a given hole 130 will be forced into contact with adjacent fingers 135 and cleaved by one of paddles 150 as shaft 145 rotates. Depending on the size of the initial clump, each new clump formed will either pass through one of holes 130 or be cleaved again.

To reduce the generation of fine particles as fingers 135 and paddles 150 break up clumps of edible material, the edges of fingers 135 and paddles 150 that contact the edible material (i.e., the side edges) are preferably blunt. The edges of holes 130 are preferably blunt as well to reduce the generation of fine particles as edible material passes through screen 125. The edges of holes 130 are also blunt so that the edges do not abrade clumps of edible material as the clumps are shifted within chamber 110, i.e., so that screen 125 does not act like a cheese grater. To provide these various blunt edges, the edges are preferably rounded, chamfered or smoothed. In addition, shaft 145 rotates relatively slow, preferably at less than 100 revolutions per minute (RPM) and, more preferably, at 30-60 RPM. This helps ensure that clumps of edible material are cleaved rather than shattered. That is, each clump is split or severed, especially along a natural line or grain, so that two new clumps are formed, with one on either side of the plane where the original clump was contacted by one of paddles 150. The clumps are not broken up along a plurality of planes, i.e., shattered, which would be the typical result if shaft 145 were rotated at the speeds seen in prior art delumpers, where a shaft might be rotated at speeds ten times as high. Of course, some amount of shattering may occur in delumper 100. Recognizing this, delumper 100 is considered to be configured so that a majority of the delumping occurs via cleaving rather than shattering, i.e., so that a majority of the edible material broken up by delumper 100 is cleaved rather than shattered.

With particular reference to FIG. 2, a top view of delumper 100 is provided. Although row 142 of fingers 135 is not visible, FIG. 2 shows that corresponding fingers 135 of rows 140 and 141 are located at the same longitudinal position along screen 125. For example, fingers 200 and 201 are both aligned at a longitudinal position 205. FIG. 2 also shows that each paddle 150 is longitudinally centered relative to those fingers 135 between which it passes. For example, a paddle 210 is longitudinally centered relative to fingers 215 and 216.

Figure 3:
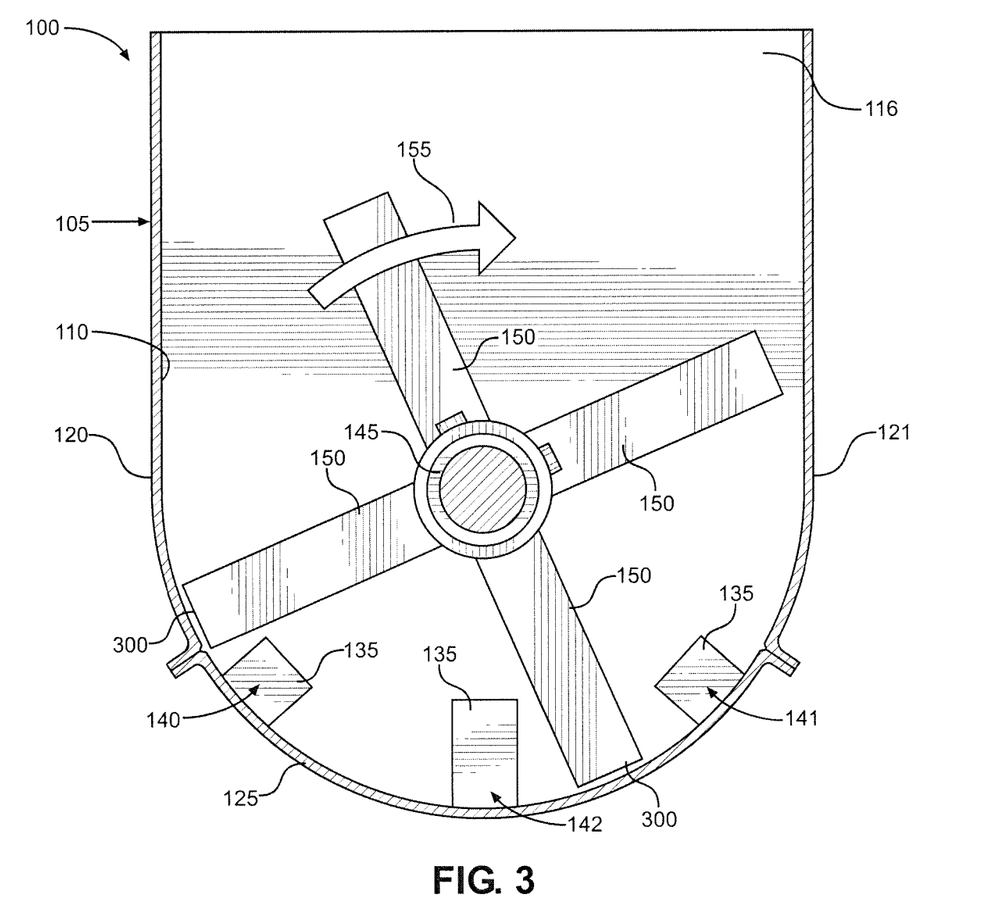
FIG. 3 is a front view of the delumper.

FIG. 3 provides a front view of delumper 100, which shows that fingers 135 of row 140 are located proximate left sidewall 120, fingers 135 of row 141 are located proximate right sidewall 121 and fingers 135 of row 142 are located in the center of screen 125. In the embodiment shown, shaft 145 rotates in a clockwise direction 155. Accordingly, paddles 150 move through chamber 110 in clockwise direction 155, with a given paddle 150 passing first through row 141, then through row 142 and finally through row 140. FIG. 3 highlights the arcuate shape of screen 125. Specifically, screen 125 has an arcuate cross section and is shaped as a partial cylinder, the center of which coincides with shaft 145. This ensures that outer ends 300 of paddles 150 maintain a fixed distance from screen 125 as paddles 150 pass by screen 125 during rotation of shaft 145. Overall, this arrangement generally resembles a clock face. In particular, paddles 150 correspond to the hands of the clock, and rows 140 and 141 are located where an hour hand would be at 7:30 and 4:30, respectively. Row 142 is located where an hour hand would be at 6:00. For purposes of the present invention, such locations are defined as 4:30, 6:00 and 7:30 positions, using the range 1:00-12:59, with the rotational direction of the hour hand corresponding to the rotational direction of paddles 150, and with the line representing the force of gravity intersecting the 12:00 and 6:00 positions.

Figure 4:
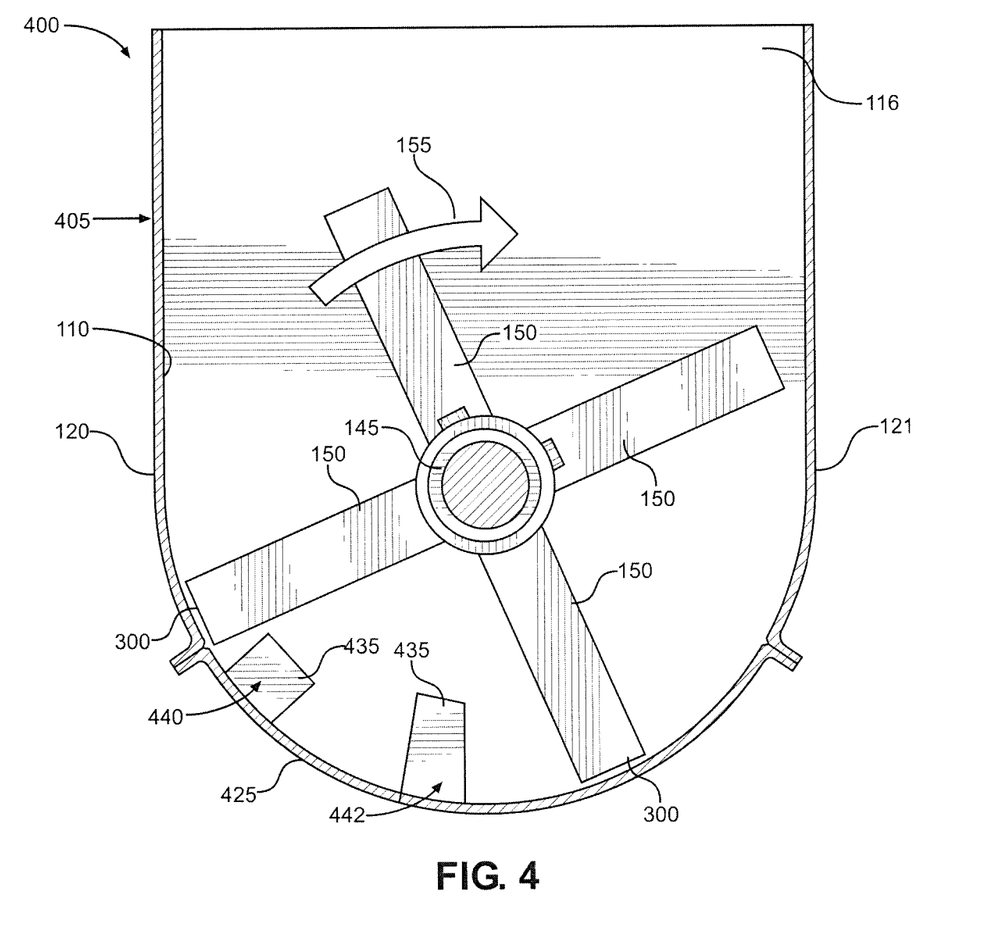
FIG. 4 is a front view of a delumper constructed in accordance with a second embodiment of the present invention.

With reference now to FIG. 4, there is shown a delumper 400 constructed in accordance with a second embodiment of the present invention. Delumper 400 is substantially the same as delumper 100, with identical parts labeled with identical reference numerals. The difference between delumpers 100 and 400 relates to the arrangement of the fingers on the screen. Specifically, a housing 405 of delumper 400 includes a screen 425 having two rows 440 and 442 of inwardly extending fingers 435 rather than three rows 140-142 as in delumper 100. Fingers 435 of row 440 are located proximate left sidewall 120, while fingers 435 of row 442 are located proximate the center of screen 425. In particular, row 440 is located at the 7:30 position, and row 442 is located between the 6:00 and 7:00 positions. Also, fingers 435 of row 442 are shown as having a different shape than fingers 135 of row 142 to illustrate that different finger shapes are usable in connection with the present invention.

Figure 5:
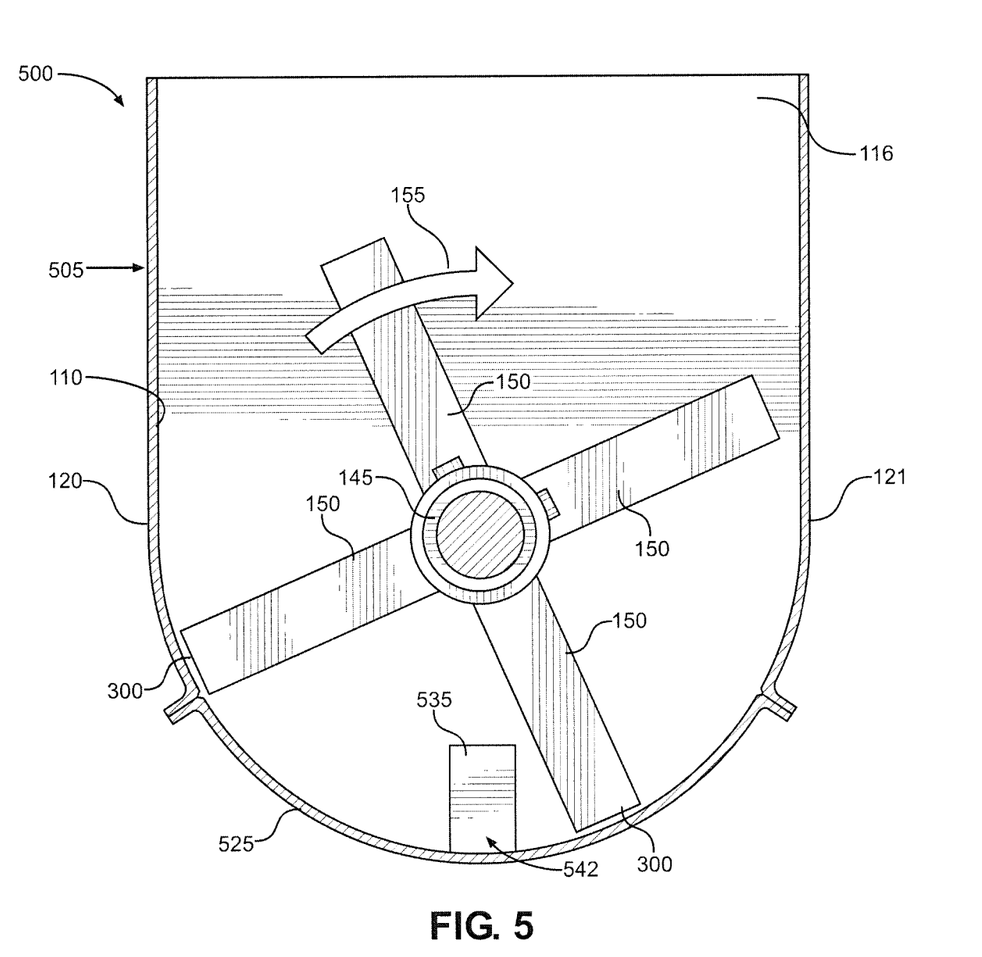
FIG. 5 is a front view of a delumper constructed in accordance with a third embodiment of the present invention.

FIG. 5 shows a delumper 500 constructed in accordance with a third embodiment of the present invention. Delumper 500 is substantially the same as delumpers 100 and 400, with identical parts labeled with identical reference numerals. The difference between delumpers 100, 400 and 500 relates to the arrangement of the fingers on the screen. Specifically, a housing 505 of delumper 500 includes a screen 525 having only one row 542 of inwardly extending fingers 535. Fingers 535 of row 542 are located proximate the center of screen 525. In particular, row 542 is located at the 6:00 position.

As illustrated by FIGS. 3-5, different arrangements of fingers can be used in connection with the present invention. Preferably, at least one row of fingers is included, with this first row being located at or between the 5:00 and 7:30 positions (like rows 142, 442 and 542). More preferably, the first row is located at or between the 6:00 and 7:00 positions. If a second row of fingers is included, this second row is preferably located at the 8:00 position or between the 8:00 position and the first row of fingers (like rows 140 and 440). If a third row of fingers is included, this third row is preferably located at the 4:00 position or between the 4:00 position and the first row of fingers (like row 141).

Also, while the spacing between adjacent fingers of a given row has been illustrated as being equal for each row of fingers, this is not required. For example, the spacing between adjacent fingers 135 of row 141 can be different than the spacing between adjacent fingers 135 of row 142, with each of these values being different than the spacing between adjacent fingers 135 of row 140. In one embodiment, the spacing decreases in the direction in which paddles 150 move through chamber 110 such that a clump of edible material that can fit through row 141 might not fit through row 142, for example. This differential spacing can be provided by varying the thickness of fingers 135 in each row or by locating fingers 135 of the same thickness at different distances from one another. In the former case, the distance between the centers of adjacent fingers 135 would be the same for each row, while the distance between the nearest faces of adjacent fingers 135 would vary. In the latter case, both distances would vary for each row.

Delumpers 100, 400 and 500 can be used in the production of a variety of different food products. In particular, as indicated above, delumpers 100, 400 and 500 can be used in the production of granola pieces which can be added to cereal, yogurt or simply directly consumed as a snack. Granola is typically packaged and sold having clumps of different sizes. Preferably, these clumps all fall within a desired size range. For example, it is preferred that especially large clumps (i.e., clumps whose size would render them difficult to eat) are eliminated. In addition, it is preferred that fine particles are eliminated. The design of delumpers 100, 400 and 500 helps accomplish these goals. Specifically, the spacing of the paddles and fingers (e.g., paddles 150 and fingers 135) helps break the granola into clumps of appropriate size, and the holes (e.g., holes 130) are sized to ensure that larger clumps of granola do not pass through the screens (e.g., screen 125). Delumpers 100, 400 and 500 reduce fine particle generation by more gently breaking up the clumps of granola and through the elimination of sharp edges on the screens, fingers and paddles (e.g., screen 125, fingers 135 and paddles 150). Beyond granola, delumpers 100, 400 and 500 can be used in the production of cereal clusters, for instance.

Based on the above, it should be readily apparent that the present invention provides a delumper that breaks up clumps of edible material into more uniformly sized pieces, while minimizing the generation of fine particles. While certain preferred embodiments of the present invention have been set forth, it should be understood that various changes or modifications could be made without departing from the spirit of the present invention. For example, although the fingers and paddles (e.g., fingers 135 and paddles 150) are largely shown as being rectangular and flat, this need not be the case. As can be seen in FIG. 4, for instance, fingers 435 of row 442 are not rectangular. Additionally, although delumpers 100, 400 and 500 are shown with open tops, the tops can be closed to establish drums or cylinders defined by one or more screens (e.g., screen 125), with these drums or cylinders rotating around stationary shafts. Furthermore, although preferred ranges for the diameter of the holes and the finger spacing have been provided, it should be recognized that the ranges could vary. For instance, holes could range up to 1.25 inches (along with a corresponding finger spacing increase) if larger clumps were desired. In general, the invention is only intended to be limited by the scope of the following claims.

The invention claimed is:
1. A delumper comprising:
a housing defining a chamber in which edible material is received, the housing including:
a screen having:
a plurality of holes, wherein the plurality of holes are sized such that edible material of a first diameter is capable of passing through the plurality of holes and edible material of a second, larger diameter is incapable of passing through the plurality of holes; and
a plurality of inwardly extending fingers, wherein the plurality of fingers are arranged in at least a first row, and the first row is located at or between a 5:00 position and a 7:30 position; and
a rotatable shaft including:
a plurality of paddles spaced along a length of the shaft, wherein, when the rotatable shaft rotates, each of the plurality of paddles passes between and through adjacent fingers of the first row such that edible material located within the chamber is forced into contact with the plurality of fingers and cleaved by the plurality of paddles.
2. The delumper of claim 1, wherein the first row is located at or between a 6:00 position and a 7:00 position.
3. The delumper of claim 1, wherein the plurality of fingers is further arranged in a second row.
4. The delumper of claim 3, wherein the second row is located at the 8:00 position or between the 8:00 position and the first row.
5. The delumper of claim 3, wherein the plurality of fingers is further arranged in a third row.
6. The delumper of claim 5, wherein the third row is located at a 4:00 position or between the 4:00 position and the first row.
7. The delumper of claim 1, further comprising a motor configured to rotate the shaft at less than 100 revolutions per minute (RPM).
8. The delumper of claim 7, wherein the motor is configured to rotate the shaft at 30 to 60 RPM.
9. The delumper of claim 1, wherein each of the plurality of holes has a hole edge, and the hole edges are blunt.
10. The delumper of claim 9, wherein:
each of the plurality of paddles has a paddle edge;
each of the plurality of fingers has a finger edge;
the paddle edges are blunt; and
the finger edges are blunt.

11. The delumper of claim 1, wherein each of the plurality of holes has a diameter of 0.750 to 1.50 inches.

12. The delumper of claim 11, wherein each of the fingers of the first row is spaced from an immediately adjacent finger of the first row by 1.50 to 2.00 inches.

13. The delumper of claim 12, wherein each of the plurality of paddles is spaced from an immediately adjacent paddle of the plurality of paddles by 1.50 to 1.75 inches.

14. The delumper of claim 1, wherein each of the plurality of paddles is longitudinally centered relative to the adjacent fingers of the first row between which the paddle passes.

15. The delumper of claim 1, wherein:
the screen is located at the bottom of the housing;
the screen has an arcuate cross section; and
the screen is shaped as a partial cylinder, a center of the cylinder being located at the shaft.

16. A method of delumping edible material comprising:
depositing the edible material in a chamber, defined by a housing, in which the edible material is received, the housing including a screen having a plurality of holes sized such that edible material of a first diameter is capable of passing through the plurality of holes and edible material of a second, larger diameter is incapable of passing through the plurality of holes, and a plurality of inwardly extending fingers, wherein the plurality of fingers are arranged in at least a first row, and the first row is located at or between a 5:00 position and a 7:30 position;
rotating a rotatable shaft, the rotatable shaft including a plurality of paddles spaced along a length of the shaft;
causing, when the rotatable shaft rotates, each of the plurality of paddles to pass between and through adjacent fingers of the first row such that the edible material located within the chamber is forced into contact with the plurality of fingers and cleaved by the plurality of paddles into edible pieces;
causing ones of the edible pieces of a first diameter to pass through the plurality of holes, while preventing others of the edible pieces of a second, larger diameter from passing through the plurality of holes; and
further rotating the shaft to cause the plurality of paddles to pass between adjacent fingers of the plurality of fingers wherein the others of the edible pieces are forced into contact with the plurality of fingers and cleaved by the plurality of paddles.

17. The method of claim 16, wherein the plurality of fingers is further arranged in a second row, and the second row is located at the 8:00 position or between the 8:00 position and the first row, the method further comprising causing the plurality of paddles to pass between adjacent fingers of the second row wherein the edible material located within the chamber is forced into contact with the fingers of the second row and cleaved by the plurality of paddles.

18. The method of claim 17, wherein the plurality of fingers is further arranged in a third row, and the third row is located at a 4:00 position or between the 4:00 position and the first row, the method further comprising causing the plurality of paddles to pass between adjacent fingers of the third row wherein the edible material located within the chamber is forced into contact with the fingers of the third row and cleaved by the plurality of paddles.

19. The method of claim 16, wherein rotating the shaft includes rotating the shaft at less than 100 revolutions per minute (RPM).

20. The method of claim 19, wherein rotating the shaft includes rotating the shaft at 30 to 60 RPM.

21. The method of claim 16, wherein:
each of the plurality of holes has a diameter of 0.750 to 1.50 inches;
causing the edible material of the first diameter to pass through the plurality of holes includes causing edible material having a diameter less than 0.750 to 1.50 inches to pass through the plurality of holes; and
preventing the edible material of the second diameter from passing through the plurality of holes includes preventing edible material having a diameter greater than 0.750 to 1.50 inches from passing through the plurality of holes.

22. The method of claim 16, wherein depositing the edible material in the chamber includes depositing granola or cereal clusters in the chamber.

* * * * *